United States Patent [19]

Dow

[11] 3,996,555

[45] Dec. 7, 1976

[54] IDENTIFICATION OF VEHICLES

[75] Inventor: Ian Malcolm Dow, Rugby, England

[73] Assignee: The Secretary of State for the Environment in Her Britannic Majesty's Government of the United Kingdom of Great Britain and Northern Ireland, London, England

[22] Filed: Sept. 9, 1975

[21] Appl. No.: 611,740

[30] Foreign Application Priority Data

Sept. 17, 1974 United Kingdom ............. 40367/74

[52] U.S. Cl. ............................... 340/38 L; 179/82; 340/258 C

[51] Int. Cl.$^2$ ....................... G08C 1/00; H04B 5/00

[58] Field of Search ................................. 340/38 L

[56] References Cited

UNITED STATES PATENTS 3,859,624 1/1975 Kreofsky ......................... 340/38 L

FOREIGN PATENTS OR APPLICATIONS 1,209,482 10/1970 United Kingdom ............. 340/38 L

*Primary Examiner*—Thomas B. Habecker
*Attorney, Agent, or Firm*—Pollock, Vande Sande & Priddy

[57] ABSTRACT

In a vehicle, an insulated multi-turn vehicle loop arranged to form a transformer with any roadway loop when said loops are in proximity; means for tuning the vehicle loop to form a vehicle loop circuit resonant at a first frequency; and means for modulating the vehicle loop circuit at a second frequency; whereby, in use, a signal modulated at said second frequency can be induced from the vehicle loop into any said roadway loop for the identification of said vehicle; and vehicle identification means comprising a roadway loop upon or in the surface of a roadway; means for tuning the roadway loop; means for energizing the roadway loop at a first frequency at least near to the resonant frequency of the tuned roadway loop; and a vehicle identification circuit having demodulation means and frequency detection means arranged to detect in the roadway loop any signal at the first frequency modulated at a second frequency, said second frequency being produced for the identification thereof by a vehicle as aforesaid and the first frequency being common to the roadway loop and the vehicle.

21 Claims, 4 Drawing Figures

IDENTIFICATION OF VEHICLES

This invention relates to a system for the identification of a road vehicle travelling along a predetermined route.

In British Patent Specification No. 1 209,482, there is disclosed a vehicle identification system in which a vehicle is provided with an insulated electrical loop which is periodically shorted out, the presence of the vehicle in the vicinity of an inductive loop in a roadway causing a change in impedance of the roadway loop, the pattern of shorting out providing an identification signal for the vehicle. The system can be additional to fixed frequency vehicle detectors which are widely used at present.

However, that system required the vehicle loop to be a single turn loop as large as the vehicle dimensions allow and mounted on the vehicle as low as possible, so that fitting the loop is difficult. The relative position of the vehicle loop and the roadway loop is critical, the signal to noise ratio of the identification signal is low, and the life of the switch is short unless the apparatus operates only when near a roadway loop.

The present invention provides an improved vehicle identification system which can if necessary be compatible with a fixed frequency vehicle detector.

According to the invention a vehicle is provided with an insulated multi-turn vehicle loop arranged on the vehicle to form a transformer with any roadway loop when said loops are in proximity; means for tuning the vehicle loop to form a vehicle loop circuit resonant at a first frequency; and means for modulating the vehicle loop circuit at a second frequency; whereby, in use, a signal modulated at said second frequency can be induced from the vehicle loop into any said roadway loop for the identification of said vehicle.

The means for modulating the vehicle loop circuit may be arranged to short out periodically part or all of the vehicle loop circuit and the shorting out may be performed by a solid state switch.

The first frequency is desirably in the range from about 50 kHz to about 150 kHz while the second frequency is desirably in the range from about 300 Hz to about 3000 Hz.

The vehicle loop may consist of a plurality of turns of wire, desirably in the range from about 15 to about 25 turns, and the loop is desirably then flat and arranged so as to be substantially parallel with any roadway on which the vehicle is located. A suitable size for the vehicle loop is about 300 mm square. As an alternative the vehicle loop may be a ferrite aerial. Desirably, the vehicle loop is screened on the side towards the main bulk of the vehicle.

According to another aspect of the invention vehicle identification means comprise a roadway loop upon or in the surface of a roadway; means for tuning the roadway loop; means for energizing the roadway loop at a first frequency at least near to the resonant frequency of the tuned roadway loop; and a vehicle identification circuit having demodulation means and frequency detection means arranged to detect in the roadway loop any signal at the first frequency modulated at a second frequency, said second frequency being produced for the identification thereof by a vehicle as aforesaid, and the first frequency being common to the roadway loop and the vehicle; desirably in the range from about 50 kHz to about 150 kHz.

Desirably the roadway loop has a number of turns in the range 1 to 3.

Preferably the frequency detection means has a plurality of tone decoders whereby signal modulated at different values of the second frequency can be individually detected and hence different classes of vehicle be identified.

The resonant frequency of the tuned roadway loop may differ from the first frequency by up to about 5%; and the vehicle identification means may have coupled to the roadway loop phase discriminator means arranged to provide an output whereby a vehicle can be detected, said vehicle not having a vehicle loop, through a change in phase, during the proximity of said vehicle, of a signal at the first frequency in the roadway loop.

According to yet a further aspect of the invention a system for the identification of a vehicle comprises a roadway loop upon or in the surface of a roadway; means for tuning the roadway loop; and means for energizing the roadway loop at a first frequency at least near to the resonant frequency of the tuned roadway loop; on at least one vehicle to be identified, when using the roadway having a said roadway loop, an insulated multi-turn vehicle loop arranged on the vehicle to form a transformer with the roadway loop when said loops are in proximity; means for tuning the vehicle loop to form a vehicle loop circuit resonant substantially at said first frequency; means for modulating the vehicle loop circuit at a second frequency; and a vehicle identification circuit having demodulation means and frequency detection means arranged to detect in the roadway loop any signal at the first frequency modulated at the second frequency.

Tone decoders for frequency detection, and phase discriminator means may be provided in association with the vehicle loop as aforesaid.

The invention will now be described by way of example only, with reference to the drawings filed with this specification in which.

Figure 1:
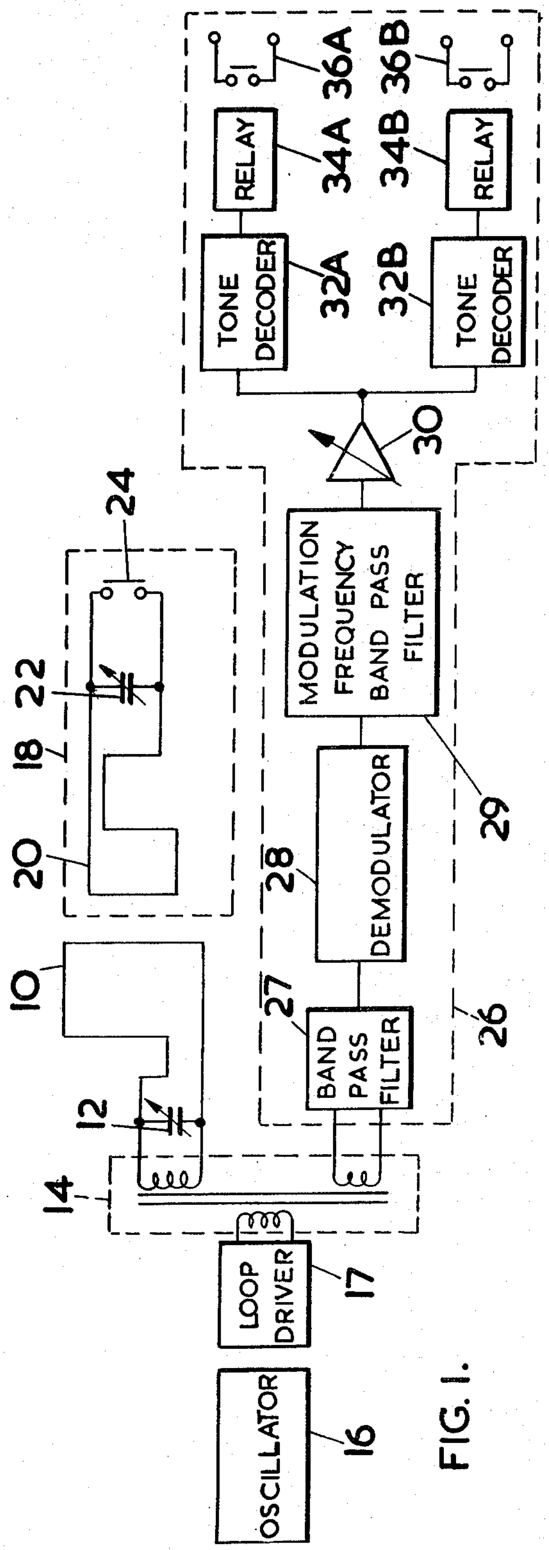
FIG. 1 shows schematically an improved vehicle identification system according to the invention.

In FIG. 1, a road loop 10 of generally rectangular form is provided in or on the surface of a roadway; the loop is typically one two or three turns of wire, 1800 mm long in the direction of travel of a vehicle.

The loop is connected to a variable switched capacitor 12 and supplied through a transformer 14 with a signal from a crystal-controlled oscillator 16 and driver 17; the capacitor 12 is adjusted so that the roadway loop oscillates at a first frequency $f_1$.

The equipment carried by a vehicle to be identified is shown in the box reference 18 and may consist of a multi-turn vehicle loop 20, for example of 20 turns of wire arranged to form a rectangle, eg 300 mm × 300 mm, encapsulated in epoxy resin and fitted to the underside of a vehicle. A variable capacitor 22 is connected across the vehicle loop and adjusted to tune the loop to frequency $f_1$. In parallel with capacitor 22 is a switch 24 which is operated to periodically short out the capacitor at a frequency $f_2$, the modulation frequency.

The vehicle identification circuit is shown in the box reference 26. The input of a demodulator 28 is connected through a radio frequency filter 27 from the transformer 14 as shown, and its output is connected through frequency bandpass filter 29, an amplifier 30, a tone decoder 32A for detecting the frequency $f_2$, to a relay coil 34A and output unit or relay 36A for indicating when that frequency is detected.

In operation, when the vehicle loop 20 is in the proximity of roadway loop 10, the loops form a low efficiency transformer, which in practice will always be at least partially air cored.

When the switch 24 is closed, capacitor 22 is shorted out but the vehicle loop 20 picks up some energy from the signal at frequency $f_1$ in the road loop 10 and a small current circulates through loop 20 and switch 24. A reflected impedance appears in the road loop due to the inductance in the vehicle loop, altering the tuning of the road loop and producing a phase change and a small amplitude change. The changes may be decreases or increases depending on the tuning of the road loop and the reflected impedance.

When the switch 24 is open, the vehicle loop 20 and capacitor 22 form a resonant circuit oscillating at frequency $f_1$, a signal of considerable amplitude is formed across loop 20, and circulating current flows, reflecting an impedance into the roadway loop 10, to induce a signal therein, modulated at $f_2$. The reactive components of the resonant circuit cancel, leaving only the coil resistance, shunted by the loss impedance, and interturn capacitance of the vehicle loop 20 to be reflected into the roadway loop 10 in which a similar low impedance is produced, modified by the square of the turns ratio and a complex coupling coefficient. The "Q" factor of the roadway loop 10 is significantly altered and a marked change in signal amplitude in the roadway loop 10 is produced.

The signal in the roadway loop 10 is passed through the transformer 14 to the demodulator 28 and the amplified signal is passed to tone decoder 32A. If the signal at frequency $f_1$ is modulated at frequency $f_2$ then the tone decoder passes a signal to the output unit 36A indicating the presence in the vicinity of roadway loop 10 of the vehicle to be identified.

Figure 2:
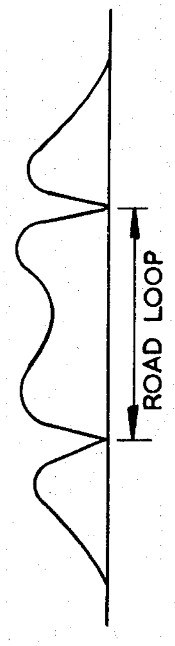
FIG. 2 is a graph of received identification signal against the relative position of the vehicle loop and roadway loop.

FIG. 2 shows the strength of the modulated signal received by the vehicle identification circuit 26 as the vehicle moves across the roadway loop. The signal increases as the vehicle approaches the roadway loop, is zero as the vehicle loop crosses the edge of the roadway loop, and reaches a maximum when the vehicle loop is just inside the roadway loop. The shape of the curve depends on the relative sizes of the roadway and vehicle loops— the FIGURE indicates the shape for a relatively small vehicle loop.

FIG. 1 also shows a second tone decoder 32B, relay 34B and output unit 36B. This arrangement is used if more than one vehicle or class of vehicles is to be detected. Each class of vehicle is arranged to have a different modulation frequency $f_2$ and the corresponding tone decoder detects that frequency and operates the associated output unit accordingly. Although only two tone decoders etc are shown, in practice a higher number of decoders can be included, ranging from say 15 decoders for minimal sophistication, up to 50 or more, depending on circuit type and components, or the use of multitone recognition allowing detection of several vehicles or classes of vehicle. Alternatively the modulation frequency bandwidth could be used for the transmission of small amounts of data in addition to simple identification. The maximum modulation frequency is determined by the rate of rise of the oscillating signal in the resonant circuit, and is typically 3kHz with the upper carrier frequencies in the range specified, ie 50 to 150 kHz.

Figure 3:
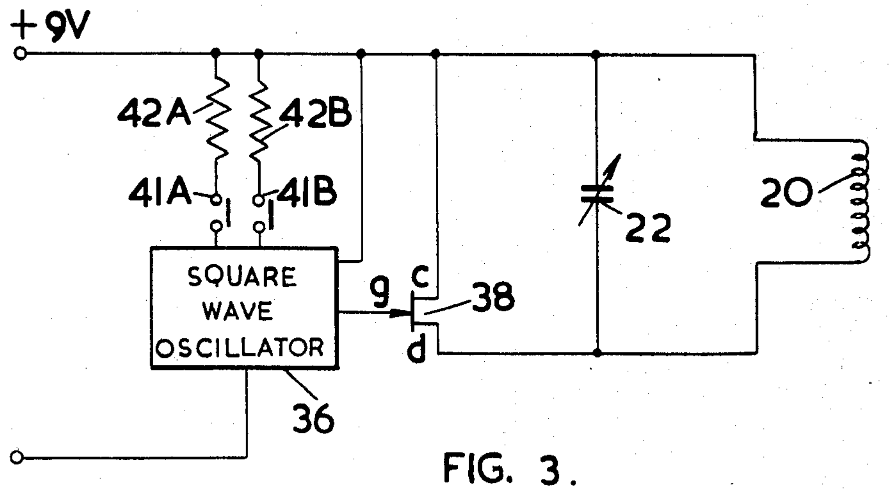
FIG. 3 illustrates in more detail the apparatus carried by a vehicle to be identified.

FIG. 3 illustrates by way of example the apparatus shown schematically in box 18 in FIG. 1. A square wave oscillator 36 of conventional kind produces a stable square wave signal at the required modulation frequency $f_2$, with a mark/space ratio adjusted to give the maximum root mean square signal in the roadway loop to compensate for the rise time in the vehicle loop circuit. This signal is applied to the gate of a Field Effect Transistor (FET) 38, such as a type 2N 4860A, or other form of soild state switch, which switches between the fully conducting and non-conducting modes. The vehicle loop 20 and capacitor 22 are connected across the transistor 38, which acts as the switch 24 in FIG. 1. The circuit is supplied with 9 volts dc from a voltage regulator supplied from the vehicle battery, or from a separate internal battery.

The oscillator 36 is connectable to one of two frequency setting resistors 42A, 42B through switches 41A, 41B which may for example be reed relay contact or switches. One of the resistors is selected by closing one of the switches, the relay causing the oscillator 36 to apply the selected modulation frequency $f_2$ to the gate of transistor 38.

In practice the vehicle loop must be tuned after it is fitted to the underside of the vehicle because the metal of the vehicle will alter the inductance of the circuit. Alternatively or additionally the vehicle loop may be screened on its upper face ie the side towards the main bulk of the vehicle by a sheet of material, eg aluminum, to minimize the detuning effect of the vehicle. Instead of a simple coil the vehicle loop may be a ferrite aerial. This includes a plurality of turns of wire associated electromagnetically with a ferrite rod.

In the vehicle indentification system according to the invention, a maximum signal would be obtained when the road loop comprises a single turn and the vehicle loop comprises a large number of turns, this giving maximum turns ratio. However, the "Q" factor of the road loop will be reduced if a single turn is used, and the resistance of the vehicle loop will increase as the number of turns increases. A compromise must therefore be reached, with two or three turns in the road loop and from about 15 to about 25 turns in the vehicle loop.

Figure 4:
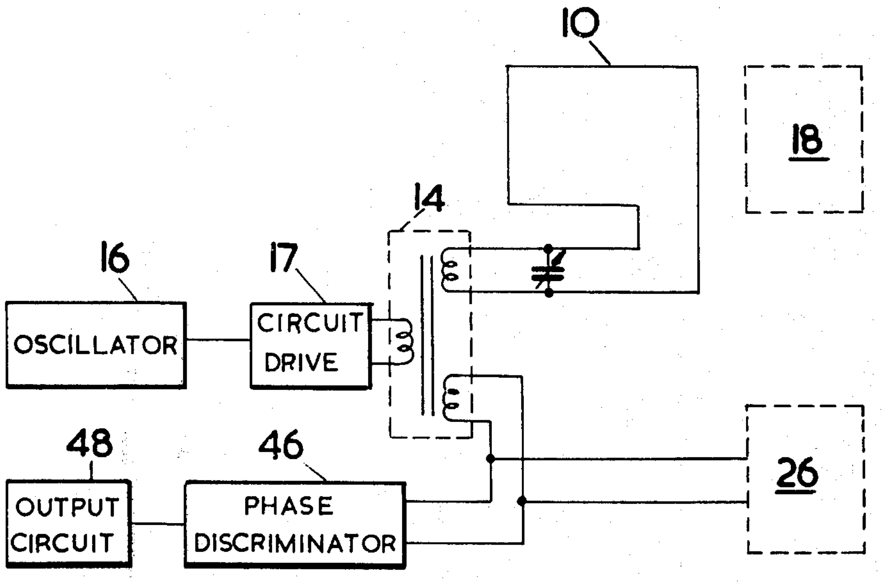
FIG. 4 shows schematically an improved vehicle identification system compatible with a conventional fixed frequency detector.

The modified apparatus may be used in conjunction with conventional fixed frequency vehicle detectors if some alterations are made. For example the roadway loop should be tuned to just below or just above resonance with the first frequency, the frequency difference being up to about 5%. The circuit is shown in FIG. 4 and is similar to FIG. 1 with the addition of a connection on transformer 14 connected to a phase discriminator 46 and output circuit 48. As a vehicle which has no vehicle loop approaches the roadway loop 10, the metal in the vehicle alters the "Q" factor of the roadway loop, causing a phase change which is detected by the phase discriminator 46 and a signal is passed to the output circuit 48. Additionally, if roadside circuit input is fed through its own signal transformer for isolation purposes, the demodulator can then be connected across the loop of a conventional fixed frequency vehicle detector. These modifications provide a dual function from a single roadway loop.

The advantages of the invention over previously used equipment are that the received carrier signal is large, and may be 6 volts rms or more, which improves the signal to noise ratio, and the inclusion of a band-pass filter tuned to the carrier frequency further improves the signal to noise ratio by removing unwanted amplitude modulated signals, eg from radio broadcasts such as Radio 2 at 200 kHz, and also removes any low frequency pick-up from underground cables which might directly produce one of the modulation frequencies. In addition there is no transmission of energy from other vehicle equipment, removing the problems associated with mobile transmitters causing interference with other apparatus; and the configuration of the road loops is non-critical.

I claim:

1. A vehicle adapted to cooperate with a roadway loop having a predetermined resonant frequency, said vehicle having an insulated multi-turn vehicle loop arranged on the vehicle to form a transformer with the roadway loop when said vehicle loop is in proximity to the roadway loop; means for tuning the vehicle loop to form a vehicle loop circuit resonant at a first frequency which is substantially the resonant frequency of the roadway loop; and means for modulating the vehicle loop circuit at a second frequency; different from said first frequency whereby, when said loops are in proximity to one another, a signal modulated at said second frequency is induced from the vehicle loop into said roadway loop for the identification of said vehicle.

2. A vehicle according to claim 1 in which the means for modulating the vehicle loop circuit comprises means operative to short out periodically at least part of the vehicle loop circuit.

3. A vehicle according to claim 2 in which said periodic shorting is effected by a solid state switch.

4. A vehicle according to claim 1 in which the first frequency is in the range from about 50 kHz to about 150 kHz.

5. A vehicle according to claim 1 in which the second frequency is in the range from about 300 Hz to about 3000 Hz.

6. A vehicle according to claim 1 in which the vehicle loop is a plurality of turns of wire.

7. A vehicle according to claim 6 in which the number of turns of wire in the vehicle loop is in the range from about 15 to about 25 turns.

8. A vehicle according to claim 6 in which the vehicle loop is flat and arranged so as to be in a plane substantially parallel with the roadway on which the vehicle is located.

9. A vehicle according to claim 8 in which the vehicle loop is about 300 mm square.

10. A vehicle according to claim 1 in which the vehicle loop is a ferrite aerial.

11. A vehicle according to claim 1 in which the vehicle loop is screened on the side towards the main bulk of the vehicle.

12. Vehicle identification means comprising a roadway loop disposed adjacent the surface of a roadway; means for tuning the roadway loop; means for energizing the roadway loop at a first frequency at least near to the resonant frequency of the tuned roadway loop; and a vehicle identification circuit coupled to said tuned roadway loop, said identification circuit having demodulation means and frequency detection means arranged to detect in the roadway loop any signal at the first frequency modulated at a second frequency, said second frequency being produced by a vehicle to be identified and which has a vehicle loop circuit thereon that is resonant at substantially the resonant frequency of said roadway loop and that has its impedance modulated at said second frequency.

13. Vehicle identification means according to claim 12 in which the first frequency is in the range from about 50 kHz to about 150 kHz.

14. Vehicle identification means according to claim 12 in which the roadway loop has a number of turns in the range 1 to 3.

15. Vehicle identification means according to claim 12 in which the frequency detection means has a plurality of tone decoders whereby signals modulated at different values of the second frequency can be individually detected different classes of vehicle to identify.

16. Vehicle identification means according to claim 12 in which the resonant frequency of the tuned roadway loop differs from the first frequency by up to about 5%.

17. Vehicle identification means according to claim 12 having phase discriminator means coupled to the roadway loop, said phase discriminator means being arranged to provide an output whereby a vehicle not having a vehicle loop can be detected through a change in phase, during the proximity of said vehicle, of a signal at the first frequency in the roadway loop.

18. A system, for the identification of a vehicle, comprising a roadway loop located adjacent the surface of a roadway; means for tuning the roadway loop; and means for energizing the roadway loop at a first frequency at least near to the resonant frequency of the tuned roadway loop; at least one vehicle to be identified when said vehicle is on said roadway, said vehicle having an insulated multi-turn vehicle loop arranged to form a transformer with the roadway loop when said loops are in proximity; means on said vehicle for tuning the vehicle loop to form a vehicle loop circuit resonant substantially at said first frequency; means on said vehicle for modulating the vehicle loop circuit at a second frequency; and a vehicle identification circuit coupled to said roadway loop and having demodulation means and frequency detection means arranged to detect in the roadway loop any signal at the first frequency modulated at the second frequency.

19. A system according to claim 18 in which the frequency detection means has a plurality of tone decoders whereby signals modulated at different values of the second frequency can be individually detected to identify different classes of vehicle.

20. A system according to claim 18 in which the resonant frequency of the tuned roadway loop differs from the first frequency by up to about 5 %.

21. A system according to claim 18 including phase discriminator means coupled to the roadway loop, said phase discriminator means being arranged to provide an output whereby a vehicle not having a vehicle loop can be detected through a change in phase, during the proximity of said vehicle, of a signal in the roadway loop at the first frequency.

* * * * *